United States Patent Office.

EDWARD OAKES WALLACE AND SAMUEL M. WALLACE, OF CLAY CENTRE, NEBRASKA.

DYE FOR LEATHER.

SPECIFICATION forming part of Letters Patent No. 425,919, dated April 15, 1890.

Application filed November 13, 1889. Serial No. 330,146. (Specimens.)

*To all whom it may concern:*

Be it known that we, EDWARD OAKES WALLACE and SAMUEL M. WALLACE, of Clay Centre, in the county of Clay and State of Nebraska, have invented certain new and useful Improvements in Dyes or Inks; and we do hereby declare the following to be a full, clear, and exact description of the invention, such as will enable others skilled in the art to which it pertains to make and use it.

Our invention relates to an improvement in dyes or inks, and which is intended more especially for blackening leather; and it consists in the combination of certain ingredients, which are preferably mixed together in a dry state and sold in that form.

We take of evaporated copperas twelve ounces; black aniline, one and one-half ounce; bichromate of potash, one-half ounce; blue vitriol, one-half ounce. These ingredients are thoroughly pulverized and mixed for sale in a powdered state. The saddler or other person wishing to use the dye or ink has only to mix a portion of this powder with a suitable quantity of water and it is ready for application at once.

This ink or dye will impart to leather a deep and permanent black.

Having thus described our invention, we claim—

A dye or ink which is specially adapted for coloring leather, consisting of copperas, aniline, bichromate of potash, and blue vitriol, in or about the proportions specified.

In testimony whereof we affix our signatures in presence of two witnesses.

EDWARD OAKES WALLACE.
SAMUEL M. WALLACE.

Witnesses:
WILLIAM M. WALTERS,
BENJAMIN F. POLLOCK.